US012143133B2

(12) United States Patent
Horn et al.

(10) Patent No.: US 12,143,133 B2
(45) Date of Patent: Nov. 12, 2024

(54) DYNAMIC SHAPING FILTER INDICATIONS

(71) Applicant: QUALCOMM Incorporated, San Diego, CA (US)

(72) Inventors: Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 17/383,039

(22) Filed: Jul. 22, 2021

(65) Prior Publication Data

US 2023/0028791 A1 Jan. 26, 2023

(51) Int. Cl.
*H04B 1/10* (2006.01)

(52) U.S. Cl.
CPC .................... *H04B 1/10* (2013.01)

(58) Field of Classification Search
CPC ... H04B 1/10; H04B 1/0003; H04L 25/03159; H04L 25/03299
See application file for complete search history.

(56) References Cited

U.S. PATENT DOCUMENTS

| 7,327,779 B1* | 2/2008 | Lugil ............... H04B 1/707 375/E1.003 |
| 8,488,655 B2* | 7/2013 | Batra ............... H04W 74/0816 375/221 |
| 8,566,687 B1* | 10/2013 | Eliaz ............... H04L 1/206 714/704 |
| 8,582,637 B1* | 11/2013 | Eliaz ............... H04L 25/03343 375/233 |
| 10,429,486 B1* | 10/2019 | O'Shea .............. H04B 1/0003 |
| 10,581,481 B1* | 3/2020 | Moradi .............. H04J 11/0066 |
| 10,841,136 B1* | 11/2020 | McCoy ............. H04L 25/03261 |
| 11,201,765 B2* | 12/2021 | Kurras .............. H04L 25/0226 |
| 11,343,823 B2* | 5/2022 | Shattil .............. H04W 72/0466 |
| 2002/0150184 A1* | 10/2002 | Hafeez ............. H04L 25/03993 375/346 |
| 2004/0125740 A1* | 7/2004 | Gardner .................. H04B 1/69 370/208 |
| 2004/0252774 A1* | 12/2004 | Park ..................... H04L 27/363 375/260 |
| 2005/0032480 A1 | 2/2005 | Lee et al. |
| 2007/0133712 A1* | 6/2007 | Benjebbour ...... H04L 25/03834 375/295 |

(Continued)

FOREIGN PATENT DOCUMENTS

CN 107483378 B 10/2020

OTHER PUBLICATIONS

International Search Report and Written Opinion—PCT/US2022/072478—ISA/EPO—Oct. 20, 2022.

(Continued)

*Primary Examiner* — Jinsong Hu
*Assistant Examiner* — Rui M Hu
(74) *Attorney, Agent, or Firm* — Harrity & Harrity, LLP

(57) ABSTRACT

Various aspects of the present disclosure generally relate to wireless communication. In some aspects, a receiving device may receive, in a communication, an indication of a shaping filter to be used with one or more subsequent communications. The receiving device may receive the one or more subsequent communications having the shaping filter applied. Numerous other aspects are described.

30 Claims, 9 Drawing Sheets

(56) References Cited

U.S. PATENT DOCUMENTS

| | | | |
|---|---|---|---|
| 2007/0183520 A1* | 8/2007 | Kim | H04L 1/0003 375/260 |
| 2007/0230593 A1* | 10/2007 | Eliaz | H04B 1/7172 375/350 |
| 2008/0037411 A1* | 2/2008 | Niemela | H04B 1/406 370/208 |
| 2009/0080565 A1* | 3/2009 | Rudolf | H04L 27/0008 375/295 |
| 2009/0201880 A1* | 8/2009 | Aghili | H04L 27/0008 370/331 |
| 2010/0048215 A1* | 2/2010 | Yavuz | H04W 36/0055 455/63.1 |
| 2010/0048221 A1* | 2/2010 | Yavuz | H04L 25/03834 455/452.2 |
| 2010/0069009 A1* | 3/2010 | Bloebaum | H04L 25/03834 455/63.1 |
| 2010/0104042 A1* | 4/2010 | Benjebbour | H04L 25/03821 375/348 |
| 2010/0290544 A1* | 11/2010 | Kawamura | H04L 25/03828 455/509 |
| 2011/0176628 A1* | 7/2011 | Rao | H04B 7/0671 375/267 |
| 2012/0120784 A1* | 5/2012 | Yang | G11B 20/10046 |
| 2012/0157109 A1* | 6/2012 | Li | H04W 28/20 455/450 |
| 2012/0163489 A1* | 6/2012 | Ramakrishnan | H04L 27/2017 375/279 |
| 2012/0321007 A1* | 12/2012 | Feher | H04B 1/709 375/261 |
| 2013/0185617 A1* | 7/2013 | Roh | H04W 4/00 370/328 |
| 2013/0343476 A1* | 12/2013 | Eliaz | H04L 27/2278 375/285 |
| 2014/0146911 A1* | 5/2014 | Eliaz | H04L 25/03197 375/285 |
| 2015/0172079 A1* | 6/2015 | Eliaz | H04L 27/38 375/296 |
| 2016/0277118 A1* | 9/2016 | Châtelain | H04B 10/25073 |
| 2017/0126442 A1* | 5/2017 | Hong | H04L 1/0084 |
| 2017/0207934 A1* | 7/2017 | Iyer Seshadri | H04L 25/03165 |
| 2017/0310373 A1* | 10/2017 | Jana | H04L 25/03343 |
| 2017/0338997 A1* | 11/2017 | McCoy | H04B 1/10 |
| 2018/0092086 A1* | 3/2018 | Nammi | H04L 27/26025 |
| 2018/0324005 A1* | 11/2018 | Kim | H04L 27/2035 |
| 2019/0036657 A1* | 1/2019 | Zhao | H04L 27/2627 |
| 2019/0081770 A1* | 3/2019 | Zhao | H04L 27/2646 |
| 2019/0222453 A1* | 7/2019 | Cao | H04L 27/2627 |
| 2019/0356364 A1* | 11/2019 | Maamari | H04L 5/0062 |
| 2020/0044897 A1* | 2/2020 | Qu | H04L 5/0053 |
| 2020/0267037 A1* | 8/2020 | Nikopour | H04L 25/03834 |
| 2020/0403675 A1* | 12/2020 | Yang | H04L 27/2613 |
| 2021/0135755 A1 | 5/2021 | Zinevich | |
| 2022/0295492 A1* | 9/2022 | Shattil | H04L 27/2636 |
| 2023/0059018 A1* | 2/2023 | Beidas | H04B 7/0413 |

OTHER PUBLICATIONS

Partial International Search Report—PCT/US2022/072478—ISA/EPO—Aug. 23, 2022.

* cited by examiner

DYNAMIC SHAPING FILTER INDICATIONS

FIELD OF THE DISCLOSURE

Aspects of the present disclosure generally relate to wireless communication and to techniques and apparatuses for dynamic shaping filter indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a receiving device. The method may include receiving, in a communication, an indication of a shaping filter to be used with one or more subsequent communications. The method may include receiving the one or more subsequent communications having the shaping filter applied.

Some aspects described herein relate to a method of wireless communication performed by a transmitting device. The method may include transmitting, in a communication, an indication of a shaping filter to be used with one or more subsequent communications. The method may include transmitting the one or more subsequent communications having the shaping filter applied.

Some aspects described herein relate to a receiving device for wireless communication. The receiving device may include a memory and one or more processors coupled to the memory. The one or more processors may be configured to receive, in a communication, an indication of a shaping filter to be used with one or more subsequent communications. The one or more processors may be configured to receive the one or more subsequent communications having the shaping filter applied.

Some aspects described herein relate to a transmitting device for wireless communication. The transmitting device may include a memory and one or more processors coupled to the memory. The one or more processors may be configured to transmit, in a communication, an indication of a shaping filter to be used with one or more subsequent communications. The one or more processors may be configured to transmit the one or more subsequent communications having the shaping filter applied.

Some aspects described herein relate to a non-transitory computer-readable medium that stores a set of instructions for wireless communication by a receiving device. The set of instructions, when executed by one or more processors of the receiving device, may cause the receiving device to receive, in a communication, an indication of a shaping filter to be used with one or more subsequent communications. The set of instructions, when executed by one or more processors of the receiving device, may cause the receiving device to receive the one or more subsequent communications having the shaping filter applied.

Some aspects described herein relate to a non-transitory computer-readable medium that stores a set of instructions for wireless communication by a transmitting device. The set of instructions, when executed by one or more processors of the transmitting device, may cause the transmitting device to transmit, in a communication, an indication of a shaping filter to be used with one or more subsequent communications. The set of instructions, when executed by one or more processors of the transmitting device, may cause the transmitting device to transmit the one or more subsequent communications having the shaping filter applied.

Some aspects described herein relate to an apparatus for wireless communication. The apparatus may include means for receiving, in a communication, an indication of a shaping filter to be used with one or more subsequent communications. The apparatus may include means for receiving the one or more subsequent communications having the shaping filter applied.

Some aspects described herein relate to an apparatus for wireless communication. The apparatus may include means for transmitting, in a communication, an indication of a shaping filter to be used with one or more subsequent communications. The apparatus may include means for transmitting the one or more subsequent communications having the shaping filter applied.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
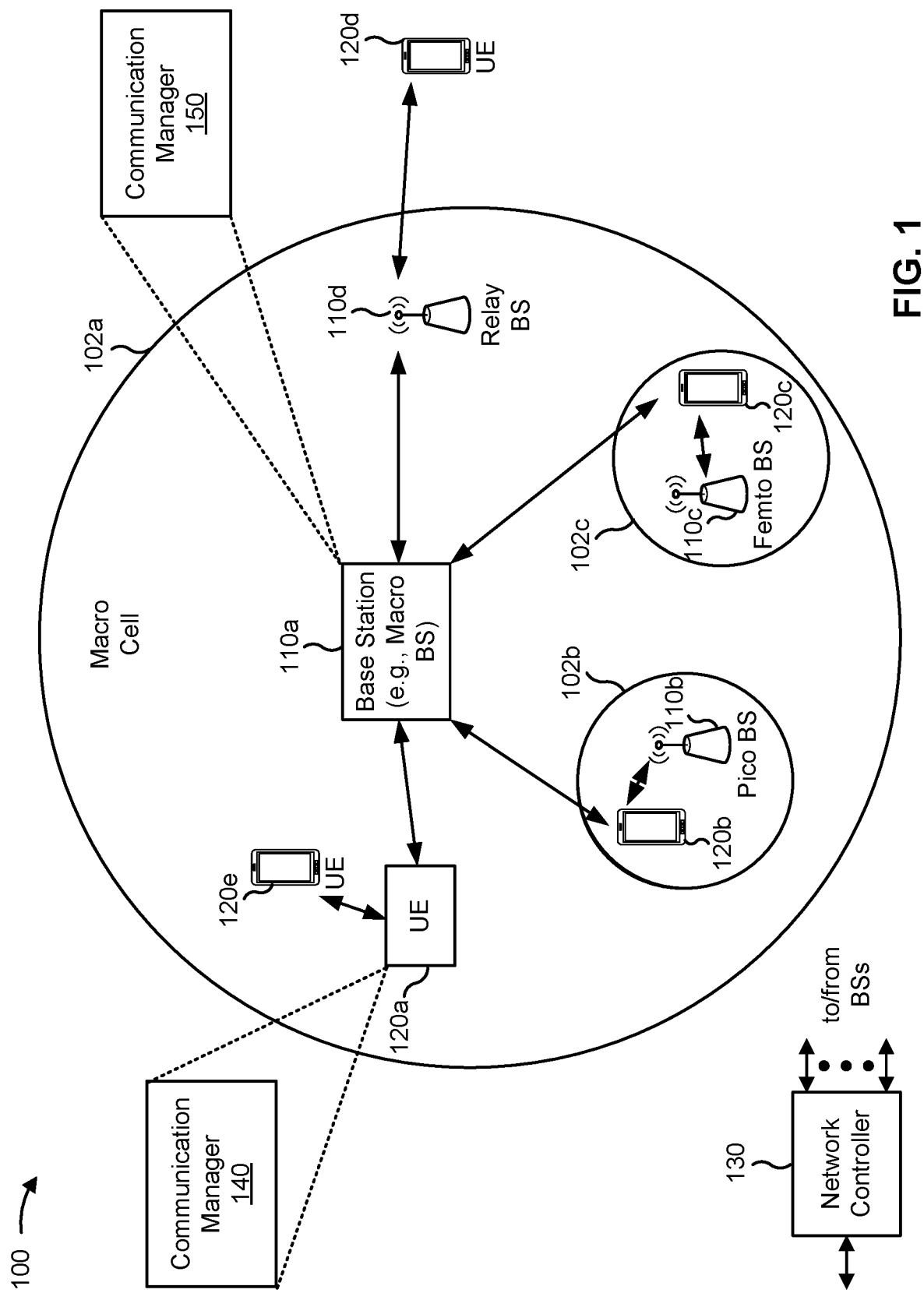
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the receiving device (e.g., a base station 110 or a UE 120) may include a communication manager 140 or 150. As described in more detail elsewhere herein, the communication manager 140 or 150 may receive, in a communication, an indication of a shaping filter to be used with one or more subsequent communications; and receive the one or more subsequent communications having the shaping filter applied. Additionally, or alternatively, the communication manager 140 or 150 may perform one or more other operations described herein.

In some aspects, the transmitting device may include a communication manager 140 or 150. As described in more detail elsewhere herein, the communication manager 140 or 150 may transmit, in a communication, an indication of a shaping filter to be used with one or more subsequent communications; and transmit the one or more subsequent communications having the shaping filter applied. Additionally, or alternatively, the communication manager 140 or 150 may perform one or more other operations described herein.

As indicated above, FIG. 1 is provided as an example. Other examples may differ from what is described with regard to FIG. 1.

Figure 2:
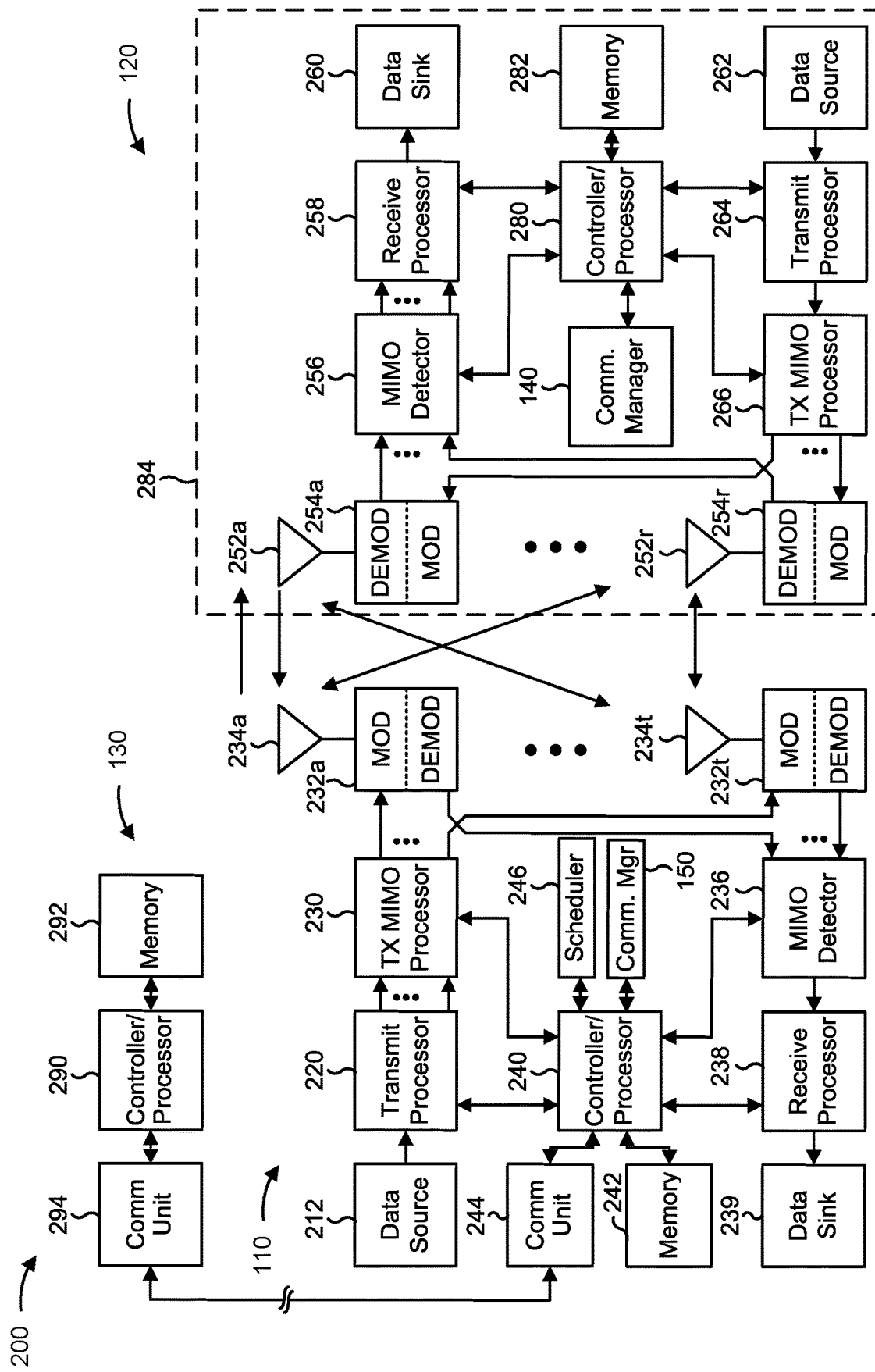
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the base station 110, the controller/processor 280 of the UE 120, and/or any other component(s) of FIG. 2 may perform one or more techniques associated with dynamic shaping filter indications, as described in more detail elsewhere herein. In some implementations, the transmitting device and/or the receiving device described herein is the base station 110, is included in the base station 110, or includes one or more components of the base station 110 shown in FIG. 2. In some implementations, the transmitting device and/or the receiving device described herein is the UE 120, is included in the UE 120, or includes one or more components of the UE 120 shown in FIG. 2. For example, the receiving device may be the UE 120 and the transmitting device may be the base station 110, or the receiving device may be the base station 110 and the transmitting device may be the UE 120.

Figure 6:
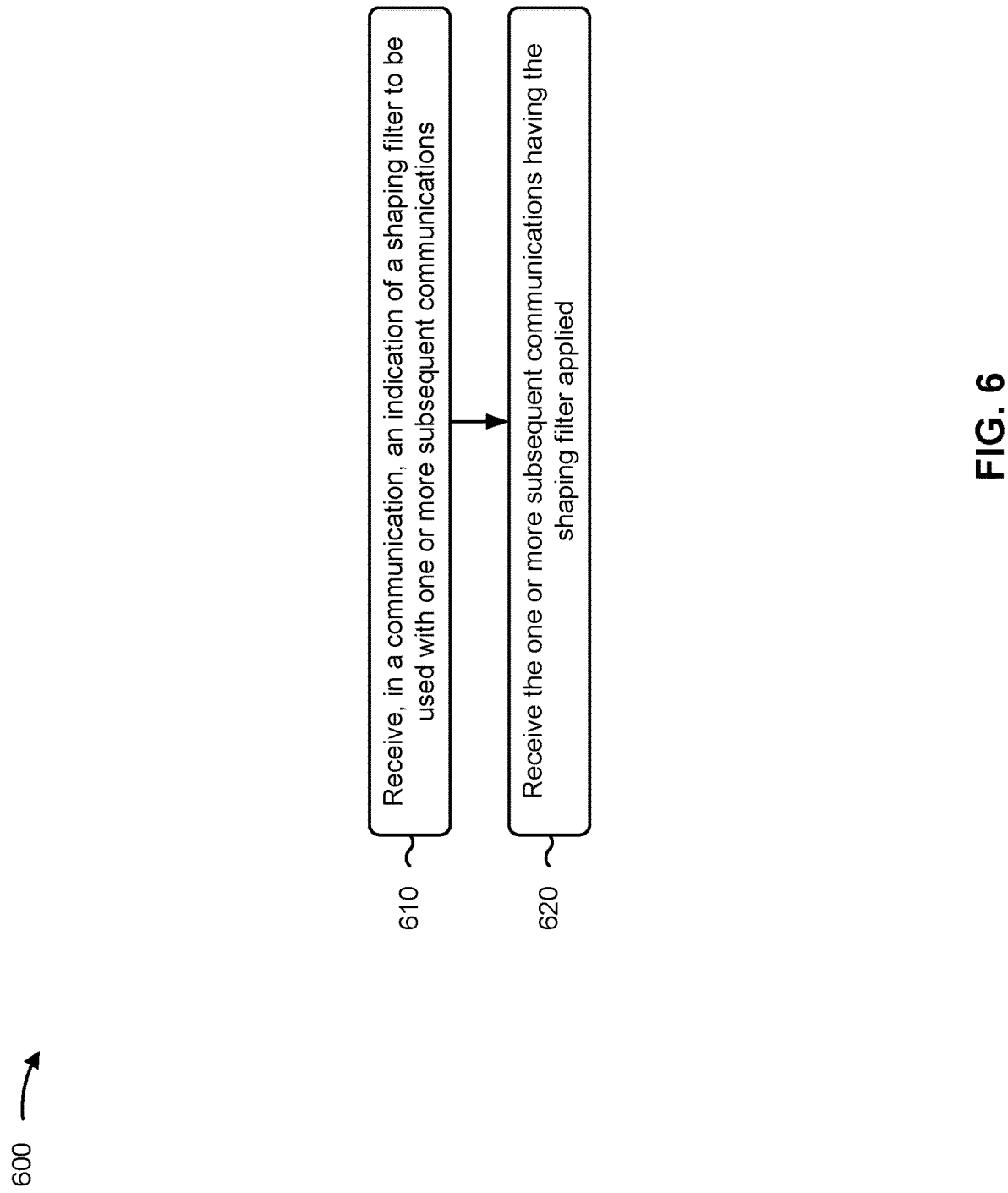
FIGS. 6 and 7 are diagrams illustrating example processes associated with dynamic shaping filter indications, in accordance with the present disclosure.
Figure 7:
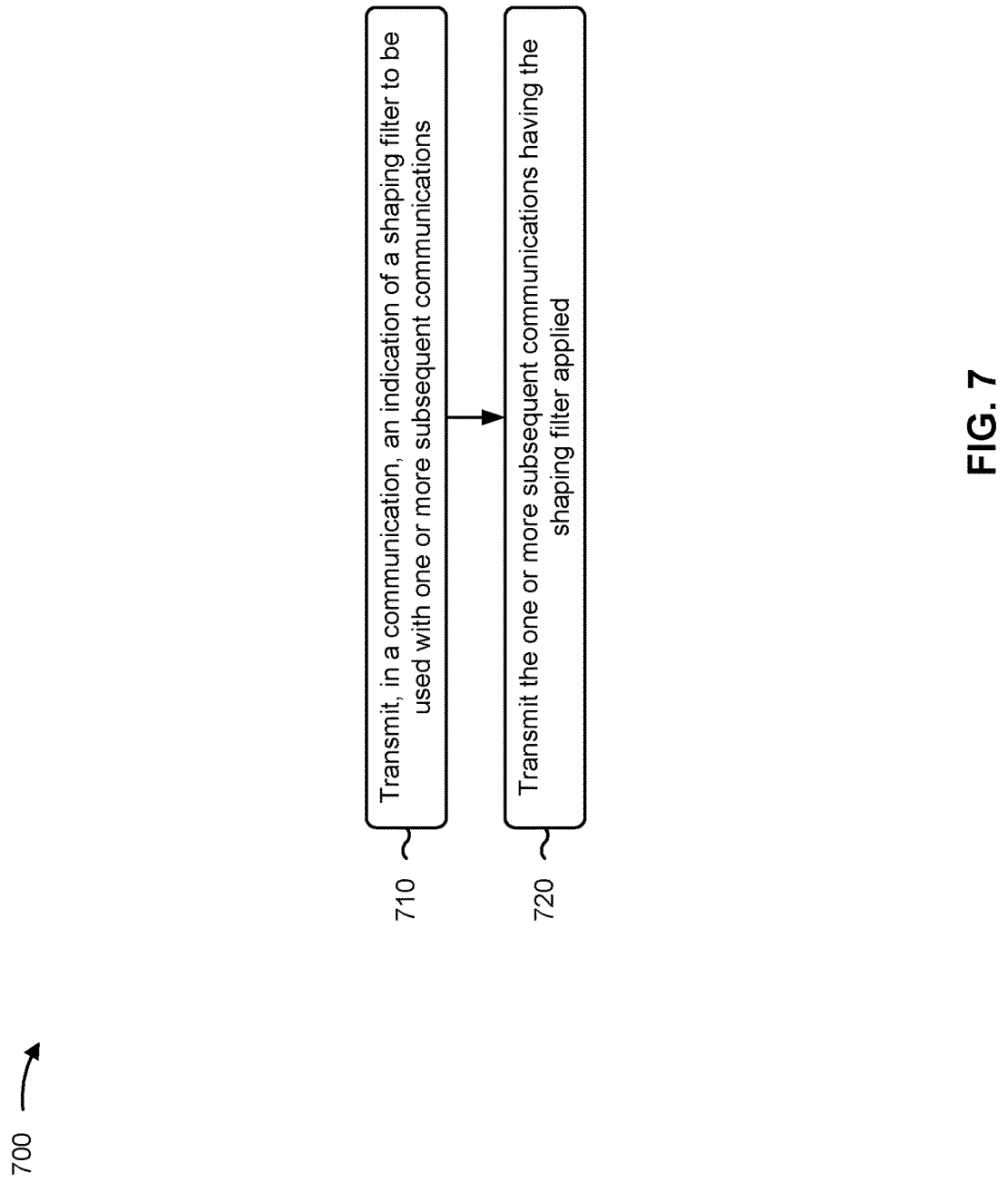

For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the receiving device includes means for receiving, in a communication, an indication of a shaping filter to be used with one or more subsequent communications; and/or means for receiving the one or more subsequent communications having the shaping filter applied. In some aspects, the means for the receiving device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiving device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitting device includes means for transmitting, in a communication, an indication of a shaping filter to be used with one or more subsequent communications; and/or means for transmitting the one or more subsequent communications having the shaping filter applied. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitting device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
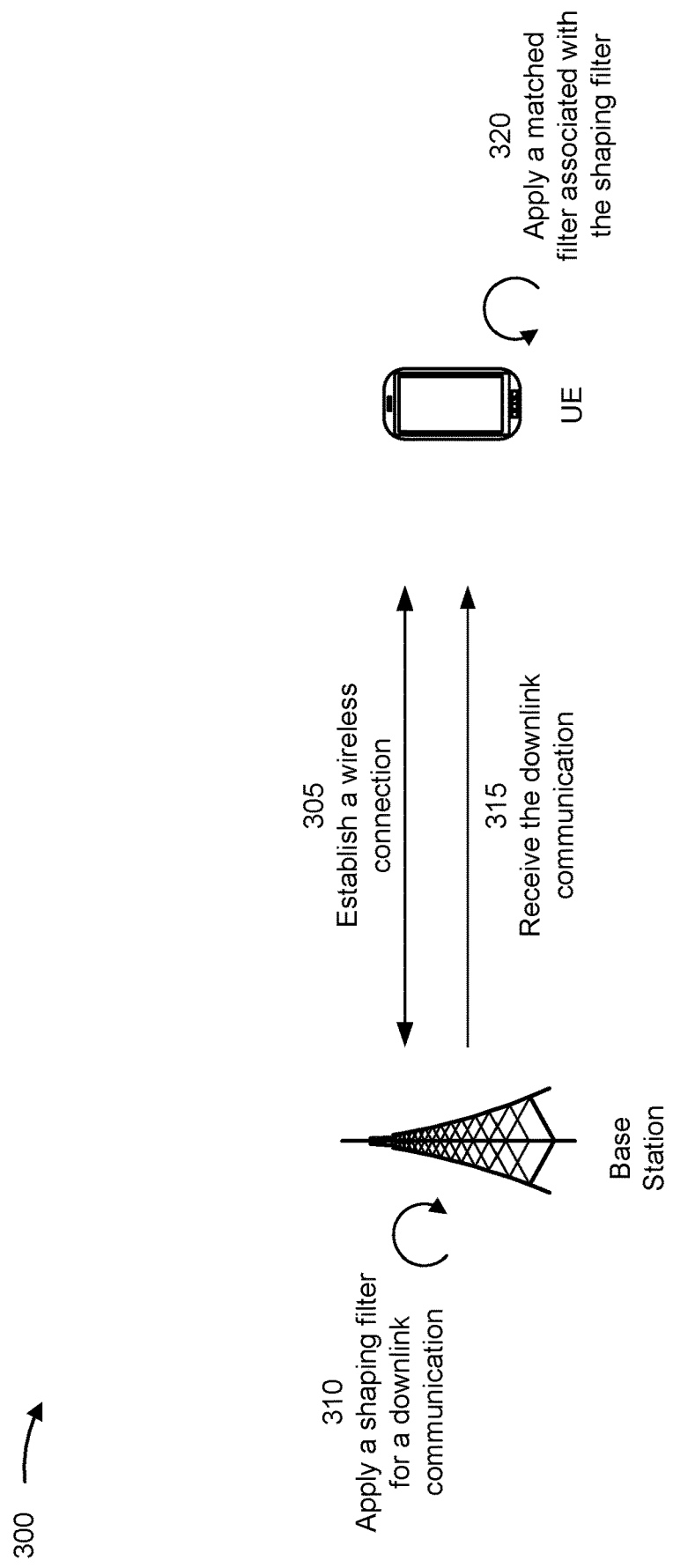
FIG. 3 is a diagram illustrating an example of applying a shaping filter for a downlink communication, in accordance with the present disclosure.

FIG. 3 is a diagram illustrating an example 300 of applying a shaping filter for a downlink communication, in accordance with the present disclosure. As shown in FIG. 3, a UE and a base station may communicate via a wireless network. The UE and the base station may have previously established a wireless connection. The wireless connection may be configured for single carrier communication between the base station and the UE.

As shown by reference number 305, the UE and the base station may establish a wireless connection. As part of establishing the wireless connection, the UE and the base station may have agreed upon a shaping filter to be applied to downlink communications. For example, the base station may indicate the shaping filter in a configuration communication. Alternatively, the base station and the UE may be aware of the shaping filter based at least in part on a communication protocol.

As shown by reference number 310, the base station may apply the shaping filter for a downlink communication. The base station may only apply the shaping filter based at least in part on the UE being aware of the shaping filter and/or a matched filter for demodulating the downlink communication.

As shown by reference number 315, the UE may receive, and the base station may transmit, the downlink communication. As part of receiving the downlink communication, the UE may apply a matched filter (associated with the shaping filter) to samples of the downlink communication, as shown by reference number 320. In this way, the UE may demodulate and decode the downlink communication.

As indicated above, FIG. 3 is provided as an example. Other examples may differ from what is described with regard to FIG. 3.

In high-frequency networks, a single carrier waveform may have better performance when compared to OFDM waveforms. For example, single carrier waveforms may have advantages in peak-to-average-power-ratios (PAPRs) and phase noise mitigation. These advantages apply at least to FR4 and FR5 and higher frequencies (e.g., frequencies greater than 20 GHz) where a channel dispersion is negligible and channel frequency responses are generally flat. Additionally, a time division multiplexing (TDM) communication may be used in high-frequency networks based at least in part on spatial separation that can be obtained (e.g., based at least in part on improved steering accuracy and beam widths associated with high-frequency communications, among other examples), which may allow a single device to consume a full bandwidth. This may support a relatively simple waveform, such as single a carrier waveform.

To use a single carrier waveform, a shaping filter, such as a square root raise cosine (SRRC) shaping filter, may be used to minimize inter-symbol interference in band-limited communications. A shaping filter may affect an error vector magnitude (EVM) and/or noise to be applied to a transmitted signal, an adjacent channel leakage ratio (ACLR), power consumption in the base station, and/or power consumption in the UE. For example, an increased length of the shaping filter may increase a power consumption of the UE and the base station.

The shaping filter may be configured statically based at least in part on parameters, such as those listed above. However, the shaping filter may be unnecessarily long when a signal has minimal inter symbol interference (e.g., based at least in part on an environment), which may consume power and computing resources of the base station and the UE unnecessarily. Alternatively, the shaping filter may be too short when a signal has high inter symbol interference (e.g., based at least in part on an environment), which may consume power and computing resources of the base station and the UE based at least in part on an increased error rate and communications associated with correcting communication errors.

In some aspects described herein, a transmitting device (e.g., a base station or a UE) may transmit, in a communication, an indication of a shaping filter to be used with one or more subsequent communications (e.g., after communicating using a prior shaping filter that is different from the shaping filter). The transmitting device may select the shaping filter based at least in part on an optimization of an EVM and/or noise to be applied to a transmitted signal, an out of band mask, an ACLR parameter, power consumption in the base station, and/or power consumption in the UE. The transmitting device may apply the shaping filter to the one or more subsequent downlink communications and transmit the one or more downlink communications. The receiving device may apply an updated matched filter that is associated with the shaping filter, which may improve a signal-to-interference-plus-noise ratio (SINR) and/or power consumption in the UE.

In some aspects, the transmitting device and/or the receiving device may report to the other of the receiving device and/or the transmitting device a capability to update a shaping filter and/or to update a matched filter. For example, a receiving device (e.g., a UE) may indicate a set of candidate filter lengths (e.g., 8 taps, 16 taps, and/or 32 taps, among other examples). The receiving device may further indicate a number of bits used in a decoder and/or an amount of power resources consumed associated with candidate filter lengths and/or bits used in the decoder. The transmitting device (e.g., a base station) may use the indication to select (e.g., dynamically) to select and/or configure an updated shaping filter associated with current channel parameters, and/or an environment, among other examples. In some aspects, the transmitting device may select and/or configure the shaping filter based at least in part on a request from the receiving device to decrease a number of taps (e.g., to improve consumption of power resources) or to increase a number of taps (e.g., to improve a throughput).

The transmitting device may transmit an indication of the shaping filter. For example, the transmitting device may transmit the indication as an explicit indication of a number of taps and tap values (e.g., in a fixed number of bits). In some aspects, the explicit indication may explicitly indicate a first half of the tap values based at least in part on symmetry of the tap values. In some aspects, the transmitting device may transmit an indication of the shaping filter based at least in part on an index associated with a candidate shaping filter, of a set of candidate shaping filters previously communicated to or from the receiving device. In some aspects, the transmitting device may transmit an indication of the shaping filter based at least in part on identifying a matched filter associated with the shaping filter. The transmitting device may transmit the indication of the shaping filter via a periodic report or via an aperiodic report.

Based at least in part on the transmitting device being configured to update a shaping filter, and the receiving device being configured to update a matched filter, the transmitting device may select a shaping filter that is optimized for channel conditions, an environment, and/or power consumption preferences (e.g., dynamically for current parameters). This may conserve computing and power resources based at least in part on avoiding unnecessarily long shaping filters when a signal has minimal inter symbol interference shaping filters that are too short when a signal has high inter-symbol interference.

Figure 4:
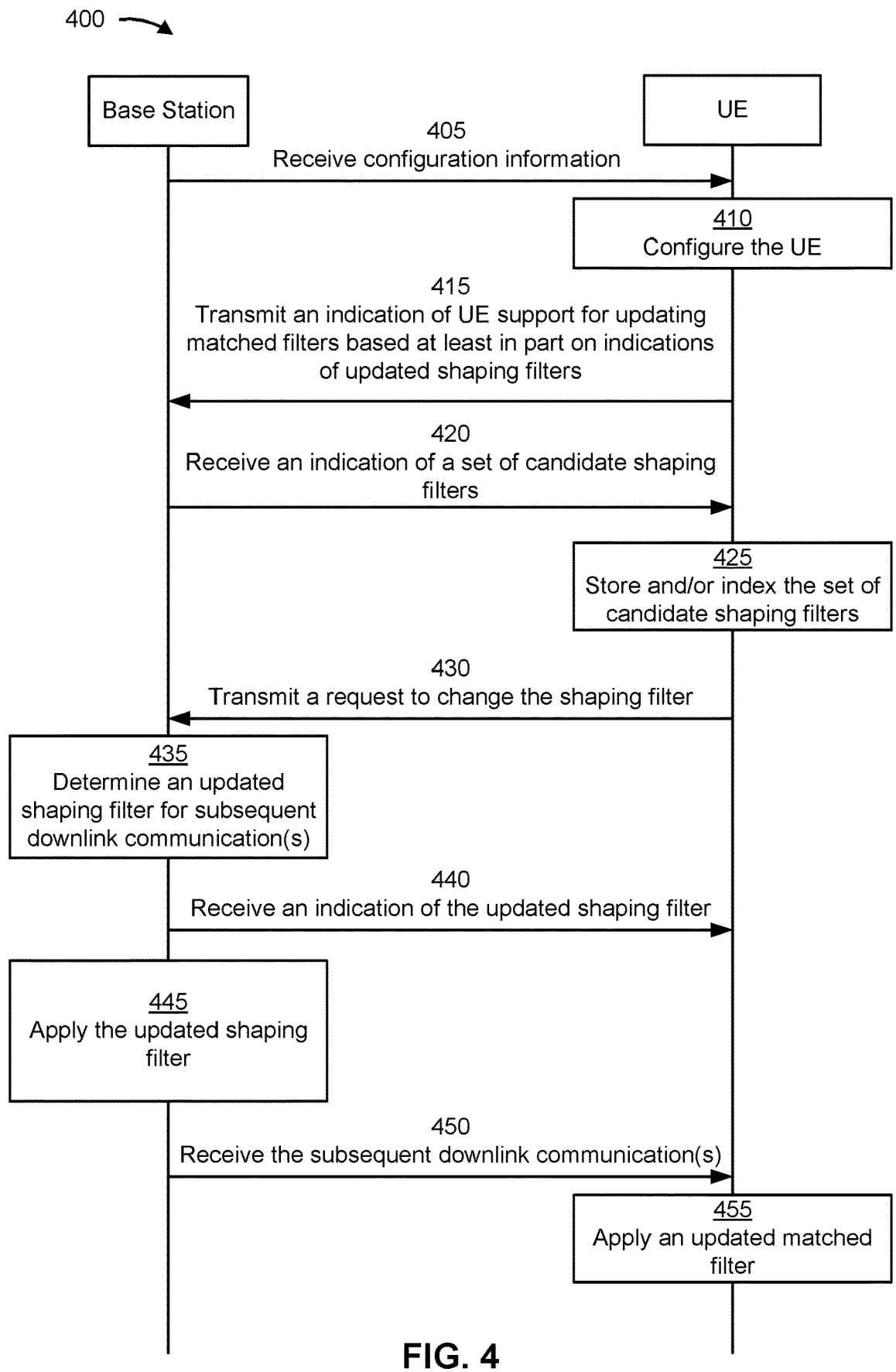
FIGS. 4 and 5 are diagrams illustrating examples associated with dynamic shaping filter indications, in accordance with the present disclosure.

FIG. 4 is a diagram illustrating an example 400 associated with dynamic shaping filter indications, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may communicate via a single carrier waveform.

As shown by reference number 405, the base station may transmit, and the UE may receive, configuration information. In some aspects, the UE may receive the configuration information via one or more of radio resource control (RRC) signaling, medium access control (MAC) control elements (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of UE support for updating matched filters based at least in part on indications of updated shaping filters. In some aspects, the configuration information may indicate that the UE is to apply matched filters associated with an indicated updated shaping filter.

As shown by reference number 410, the UE may configure the UE based at least in part on the configuration information. In some aspects, the UE may be configured to perform one or more operations described herein based at least in part on the configuration information.

As shown by reference number 415, the UE may transmit, and the base station may receive, an indication of UE support for updating matched filters based at least in part on indication of updated shaping filters. The indication of UE support for updating matched filters based at least in part on indication of updated shaping filters may be associated with improving UE power efficiency and/or error rates, among other examples. In some aspects, the UE may transmit the indication of UE support in an RRC message (e.g., as part of an RRC configuration process, among other examples). In some aspects, the UE may transmit the indication of UE support within one or more MAC CEs and/or within a physical uplink control channel (PUCCH) communication. For example, the UE may transmit the indication of UE support based at least in part on the UE detecting that a shaping filter is unnecessarily long or too short for current conditions and/or current preferences, among other examples.

In some aspects, the UE may indicate filter lengths supported by the UE, numbers of bits used for different filter lengths supported by the UE, and/or power consumed for different filter lengths supported by the UE. In some aspects, the indication of UE support for updating matched filters may include an indication of supported numbers of taps for the shaping filters. In some aspects, the UE may separately indicate the supported numbers of taps for the shaping filters. In some aspects, the UE may indicate a change to the supported numbers of taps. For example, the UE may indicate that it no longer supports a previously supported number of taps based at least in part on a preference to reduce power consumption.

As shown by reference number 420, the UE may receive, and the base station may transmit, an indication of a set of candidate shaping filters. In some aspects, the set of candidate shaping filters may be associated with indices to be used by the base station to identify an updated shaping filter. In some aspects, the indication of the set of candidate shaping filters may include, or consist of, a set of matched filters associated with a set of candidate shaping filters that the base station may select as updated shaping filters.

As shown by reference number 425, the UE may store and/or index the set of candidate shaping filters. For example, the UE may store the set of candidate shaping filters and/or associated indices for candidate shaping filters based at least in part on an indication from the base station. In this way, the base station may indicate an updated shaping filter and/or updated matched filter (e.g., dynamically) using an index associated with the updated matched filter within the set of candidate shaping filters.

As shown by reference number 430, the UE may transmit, and the base station may receive, a request to change the shaping filter. In some aspects, the UE may transmit the request to change the shaping filter based at least in part on a preference to reduce power consumption, a preference to improve throughput, and/or a determination that a shaping filter may be changed to optimize for power consumption, EVM, noise, and/or ACLR, among other examples. For example, the UE may transmit a request to reduce a number of taps used for the one or more subsequent communications.

As shown by reference number 435, the base station may determine an updated shaping filter for one or more subsequent downlink communications. In some aspects, the base station may determine to update the shaping filter based at least in part on the request described in connection with reference number 430. Alternatively, the base station may determine to update the shaping filter independently from (e.g., in the absence of) the request described in connection with reference number 430.

In some aspects, the base station may select the shaping filter based at least in part on an EVM associated with PAPR reduction, a rank of a shared channel associated with the one or more subsequent communications, a restriction of out of band emissions, power consumption for the UE, an expected SINR as observed at the UE, and/or interference mitigation associated with communications with an additional receiving device or an additional transmitting device.

As shown by reference number 440, the UE may receive, and the base station may transmit, an indication of the shaping filter. In some aspects, the indication may include an indication of a number of taps used or values of the taps. In some aspects, the indication of the shaping filter may include an indication within a fixed number of bits and/or an indication that the shaping filter is symmetric. For example, the indication may include a fixed number of bits of DCI, which may include an indication of a number of taps and locations of each tap, or may include an indication of a number of taps and locations of half of the taps with an indication that the taps are in symmetric locations. In some aspects, the indication may include an indication of the shaping filter within the set of candidate shaping filters described in connection with reference number 420. In some aspects, the indication may include, or consist of, an indication of a recommended matched filter to apply to reception of the one or more subsequent communications.

As shown by reference number 445, the base station may apply the shaping filter. As shown by reference number 450, the UE may receive, and the base station may transmit, the one or more subsequent downlink communications. The one or more subsequent downlink communications have the shaping filter applied based at least in part on the indication described in connection with reference number 440.

As shown by reference number 455, the UE may apply the updated matched filter. For example, the UE may apply the updated matched filter, associated with the shaping filter, to received samplings associated with the one or more subsequent communications.

As indicated above, FIG. 4 is provided as an example. Other examples may differ from what is described with regard to FIG. 4.

Figure 5:
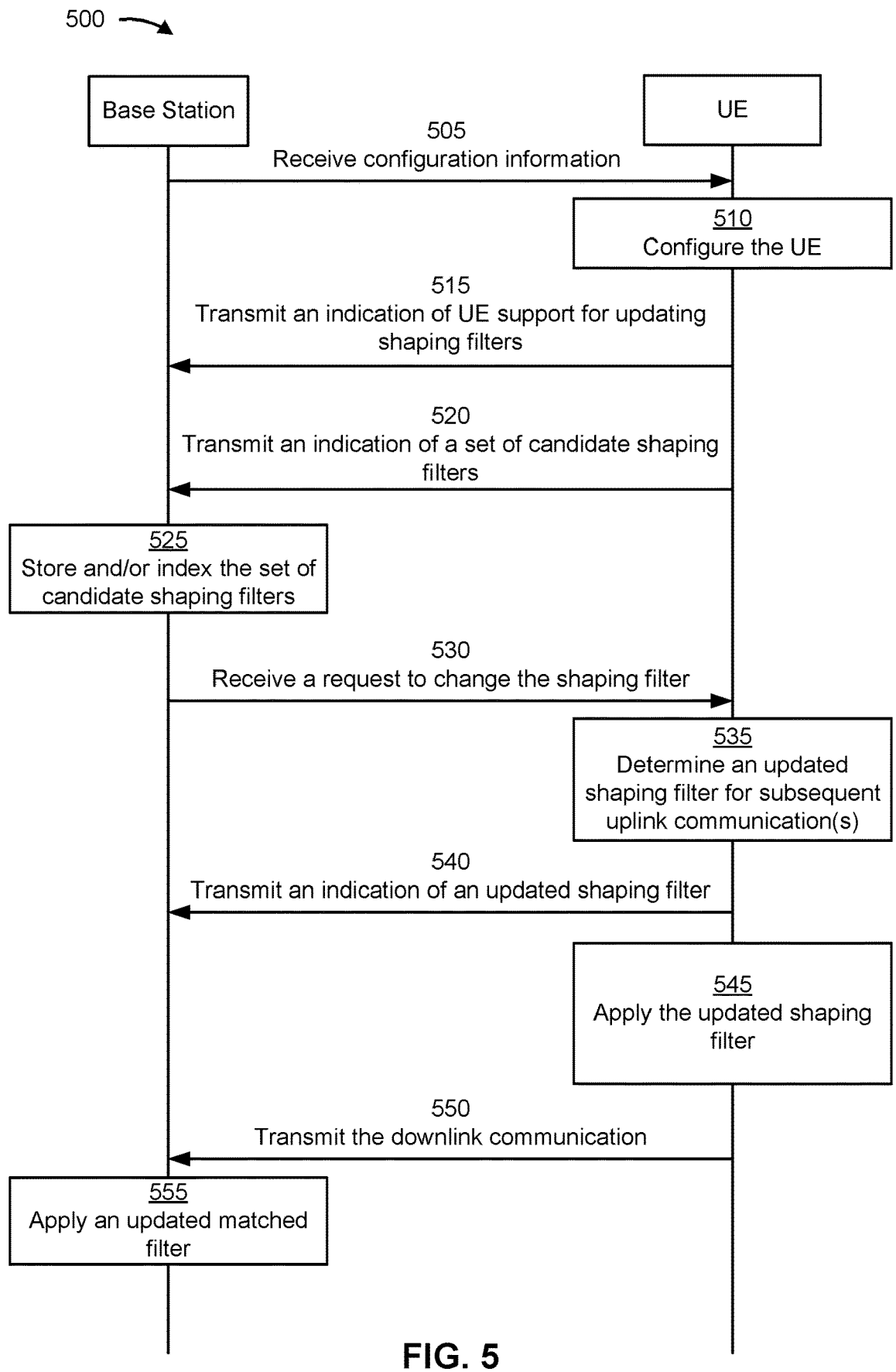

FIG. 5 is a diagram illustrating an example 500 associated with dynamic shaping filter indications, in accordance with the present disclosure. As shown in FIG. 5, a base station (e.g., base station 110) may communicate with a UE (e.g., UE 120). In some aspects, the base station and the UE may be part of a wireless network (e.g., wireless network 100). The UE and the base station may communicate via a single carrier waveform.

As shown by reference number 505, the base station may transmit, and the UE may receive, configuration information. In some aspects, the UE may receive the configuration information via one or more of RRC signaling, MAC CEs, and/or DCI, among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of UE support for updating shaping filters. In some aspects, the configuration information may indicate that the base station is to apply matched filters associated with an indicated updated shaping filter.

As shown by reference number 510, the UE may configure the UE based at least in part on the configuration information. In some aspects, the UE may be configured to perform one or more operations described herein based at least in part on the configuration information.

As shown by reference number 515, the UE may transmit, and the base station may receive, an indication of UE support for updating shaping filters. The indication of UE support for updating shaping filters may be associated with improving UE power efficiency and/or error rates, among other examples. In some aspects, the UE may transmit the indication of UE support in an RRC message (e.g., as part of an RRC configuration process, among other examples). In some aspects, the UE may transmit the indication of UE support within one or more MAC CEs and/or within a PUCCH communication. For example, the UE may transmit the indication of UE support based at least in part on the UE detecting that a shaping filter is unnecessarily long or too short for current conditions and/or current preferences, among other examples.

In some aspects, the UE may indicate filter lengths supported by the UE, numbers of bits used for different filter lengths supported by the UE, and/or power consumed for different filter lengths supported by the UE. In some aspects, the indication of UE support for updating matched filters may include an indication of supported numbers of taps for the shaping filters. In some aspects, the UE may separately indicate the supported numbers of taps for the shaping filters. In some aspects, the UE may indicate a change to the supported numbers of taps. For example, the UE may indicate that it no longer supports a previously supported number of taps based at least in part on a preference to reduce power consumption.

As shown by reference number 520, the UE may transmit, and the base station may receive, an indication of a set of candidate shaping filters. In some aspects, the set of candidate shaping filters may be associated with indices to be used by the UE to identify an updated shaping filter. In some aspects, the indication of the set of candidate shaping filters may include, or consist of, a set of matched filters associated with a set of candidate shaping filters that the UE may select as updated shaping filters.

As shown by reference number 525, the base station may store and/or index the set of candidate shaping filters. For example, the base station may store the set of candidate shaping filters and/or associated indices for candidate shaping filters based at least in part on an indication from the UE. In this way, the UE may indicate an updated shaping filter and/or updated matched filter (e.g., dynamically) using an index associated with the updated matched filter within the set of candidate shaping filters.

As shown by reference number 530, the base station may transmit, and the UE may receive, a request to change (e.g., updated) the shaping filter. In some aspects, the base station may transmit the request to change the shaping filter based at least in part on a preference to reduce power consumption, a preference to improve throughput, and/or a determination that a shaping filter may be changed to optimize for power consumption, EVM, noise, and/or ACLR, among other examples. For example, the base station may transmit a request to reduce a number of taps used for the one or more subsequent communications.

As shown by reference number 535, the UE may determine an updated shaping filter for one or more subsequent uplink communications. In some aspects, the UE may determine to update the shaping filter based at least in part on the request described in connection with reference number 530. Alternatively, the UE may determine to update the shaping filter independently from (e.g., in the absence of) the request described in connection with reference number 530.

In some aspects, the UE may select the updated shaping filter based at least in part on an EVM associated with PAPR reduction, a rank of a shared channel associated with the one or more subsequent communications, a restriction of out of band emissions, power consumption for the UE and/or base station, an expected SINR as observed at the base station, and/or interference mitigation associated with communications with an additional receiving device or an additional transmitting device (e.g., as indicated by the base station).

As shown by reference number 540, the base station may receive, and the UE may transmit, an indication of the updated shaping filter. In some aspects, the indication may include an indication of a number of taps used or values of the taps. In some aspects, the indication of the shaping filter may include an indication within a fixed number of bits and/or an indication that the shaping filter is symmetric. For example, the indication may include a fixed number of bits of uplink control information (UCI) or a shared channel communication, which may include an indication of a number of taps and locations of each tap, or may include an indication of a number of taps and locations of half of the taps with an indication that the taps are in symmetric locations. In some aspects, the indication may include an indication of the updated shaping filter within the set of candidate shaping filters described in connection with reference number 520. In some aspects, the indication may include, or consist of, an indication of a recommended matched filter to apply to reception of the one or more subsequent communications.

As shown by reference number 545, the UE may apply the updated shaping filter. As shown by reference number 550, the base station may receive, and the UE may transmit, the one or more subsequent uplink communications. The one or more subsequent uplink communications have the updated shaping filter applied based at least in part on the indication described in connection with reference number 540.

As shown by reference number 555, the base station may apply the updated matched filter. For example, the base station may apply the updated matched filter, associated with the shaping filter, to received samplings associated with the one or more subsequent communications.

As indicated above, FIG. 5 is provided as an example. Other examples may differ from what is described with regard to FIG. 5.

Based at least in part on a transmitting device (e.g., the base station 110 or the UE 120) being configured to update a shaping filter, and a receiving device (e.g., the UE 120 or the base station 110) being configured to update a matched filter, the transmitting device may select a shaping filter (e.g., an updated shaping filter) that is optimized for channel conditions, an environment, and/or power consumption preferences (e.g., dynamically for current parameters). This may conserve computing and power resources based at least in part on avoiding unnecessarily long shaping filters when a signal has minimal inter-symbol interference shaping filters that are too short when a signal has high inter-symbol interference.

FIG. 6 is a diagram illustrating an example process 600 performed, for example, by a receiving device, in accordance with the present disclosure. Example process 600 is an example where the receiving device (e.g., base station 110 or UE 120) performs operations associated with dynamic shaping filter indications.

As shown in FIG. 6, in some aspects, process 600 may include receiving, in a communication, an indication of a shaping filter to be used with one or more subsequent communications (block 610). For example, the receiving device (e.g., using communication manager 140 or 150 and/or reception component 802, depicted in FIG. 8) may receive, in a communication, an indication of a shaping filter (e.g., an updated shaping filter) to be used with one or more subsequent communications, as described above.

As further shown in FIG. 6, in some aspects, process 600 may include receiving the one or more subsequent communications having the shaping filter applied (block 620). For example, the receiving device (e.g., using communication manager 140 or 150 and/or reception component 802, depicted in FIG. 8) may receive the one or more subsequent communications having the shaping filter applied, as described above.

Process 600 may include additional aspects, such as any single aspect or any combination of aspects described below and/or in connection with one or more other processes described elsewhere herein.

In a first aspect, receiving the one or more subsequent communications comprises applying an updated matched filter, associated with the shaping filter, to received samplings associated with the one or more subsequent communications.

In a second aspect, alone or in combination with the first aspect, process 600 includes transmitting an indication of a capability of the receiving device to update matched filters based at least in part on the indication of the shaping filter.

In a third aspect, alone or in combination with one or more of the first and second aspects, the indication of the capability of the receiving device to update matched filters comprises an indication of one or more of filtering lengths supported by the receiving device, numbers of bits used for different filter lengths supported by the receiving device, or power consumed for different filter lengths supported by the receiving device.

In a fourth aspect, alone or in combination with one or more of the first through third aspects, receiving the one or more subsequent communications comprises receiving the one or more subsequent communications via one or more single carrier waveform communications.

In a fifth aspect, alone or in combination with one or more of the first through fourth aspects, the indication of the shaping filter comprises one or more of a number of taps used, or values of the taps.

In a sixth aspect, alone or in combination with one or more of the first through fifth aspects, the indication of the shaping filter indicates the values of the taps via one or more of a fixed number of bits, or an indication that the shaping filter is symmetric.

In a seventh aspect, alone or in combination with one or more of the first through sixth aspects, process 600 includes receiving an indication of a set of candidate shaping filters, wherein the indication of the shaping filter includes an indication of the shaping filter within the set of candidate shaping filters.

In an eighth aspect, alone or in combination with one or more of the first through seventh aspects, process 600 includes transmitting a request to reduce a number of taps used for the one or more subsequent communications, wherein receiving the indication of the shaping filter is based at least in part on transmitting the request.

In a ninth aspect, alone or in combination with one or more of the first through eighth aspects, the indication of the shaping filter comprises an indication of a recommended matched filter to apply to reception of the one or more subsequent communications.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a transmitting device, in accordance with the present disclosure. Example process 700 is an example where the transmitting device (e.g., transmitting device base station 110 or UE 120) performs operations associated with dynamic shaping filter indications.

As shown in FIG. 7, in some aspects, process 700 may include transmitting, in a communication, an indication of a shaping filter to be used with one or more subsequent communications (block 710). For example, the transmitting device (e.g., using communication manager 140 or 150 and/or transmission component 904, depicted in FIG. 9) may transmit, in a communication, an indication of a shaping filter to be used with one or more subsequent communications, as described above.

As further shown in FIG. 7, in some aspects, process 700 may include transmitting the one or more subsequent communications having the shaping filter applied (block 720). For example, the transmitting device (e.g., using communication manager 140 or 150 and/or transmission component 904, depicted in FIG. 9) may transmit the one or more subsequent communications having the shaping filter applied, as described above.

Process 700 may include additional aspects, such as any single aspect or any combination of aspects described below and/or in connection with one or more other processes described elsewhere herein.

In a first aspect, process 700 includes applying a shaping filter to the one or more subsequent communications.

In a second aspect, alone or in combination with the first aspect, application of the shaping filter is based at least in part on one or more of an error vector magnitude associated with peak-to-average-power-ratio reduction, a rank of a shared channel associated with the one or more subsequent communications, a restriction of out of band emissions, power consumption for a receiving device, an expected signal-to-interference-plus-noise ratio as observed at the receiving device, or interference mitigation associated with communications with an additional receiving device or an additional transmitting device.

In a third aspect, alone or in combination with one or more of the first and second aspects, transmitting the one or more subsequent communications comprises applying the shaping filter to transmitted signals associated with the one or more subsequent communications.

In a fourth aspect, alone or in combination with one or more of the first through third aspects, process 700 includes receiving an indication of a capability of a receiving device to update matched filters based at least in part on the indication of the shaping filter.

In a fifth aspect, alone or in combination with one or more of the first through fourth aspects, the indication of the capability of the receiving device to update matched filters comprises an indication of one or more of filtering lengths supported by the receiving device, numbers of bits used for different filter lengths supported by the receiving device, or power consumed for different filter lengths supported by the receiving device.

In a sixth aspect, alone or in combination with one or more of the first through fifth aspects, transmitting the one or more subsequent communications comprises transmitting the one or more subsequent communications via one or more single carrier waveform communications.

In a seventh aspect, alone or in combination with one or more of the first through sixth aspects, the indication of the shaping filter comprises one or more of a number of taps used, or values of the taps.

In an eighth aspect, alone or in combination with one or more of the first through seventh aspects, the indication of the shaping filter indicates the values of the taps via one or more of a fixed number of bits, or an indication that the shaping filter is symmetric.

In a ninth aspect, alone or in combination with one or more of the first through eighth aspects, process 700 includes transmitting an indication of a set of candidate shaping filters, wherein the indication of the shaping filter includes an indication of the shaping filter within the set of candidate shaping filters.

In a tenth aspect, alone or in combination with one or more of the first through ninth aspects, process 700 includes receiving a request to reduce a number of taps used for the one or more subsequent communications, wherein transmitting the indication of the shaping filter is based at least in part on receiving the request.

In an eleventh aspect, alone or in combination with one or more of the first through tenth aspects, the indication of the shaping filter comprises an indication of a recommended matched filter to apply to reception of the one or more subsequent communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
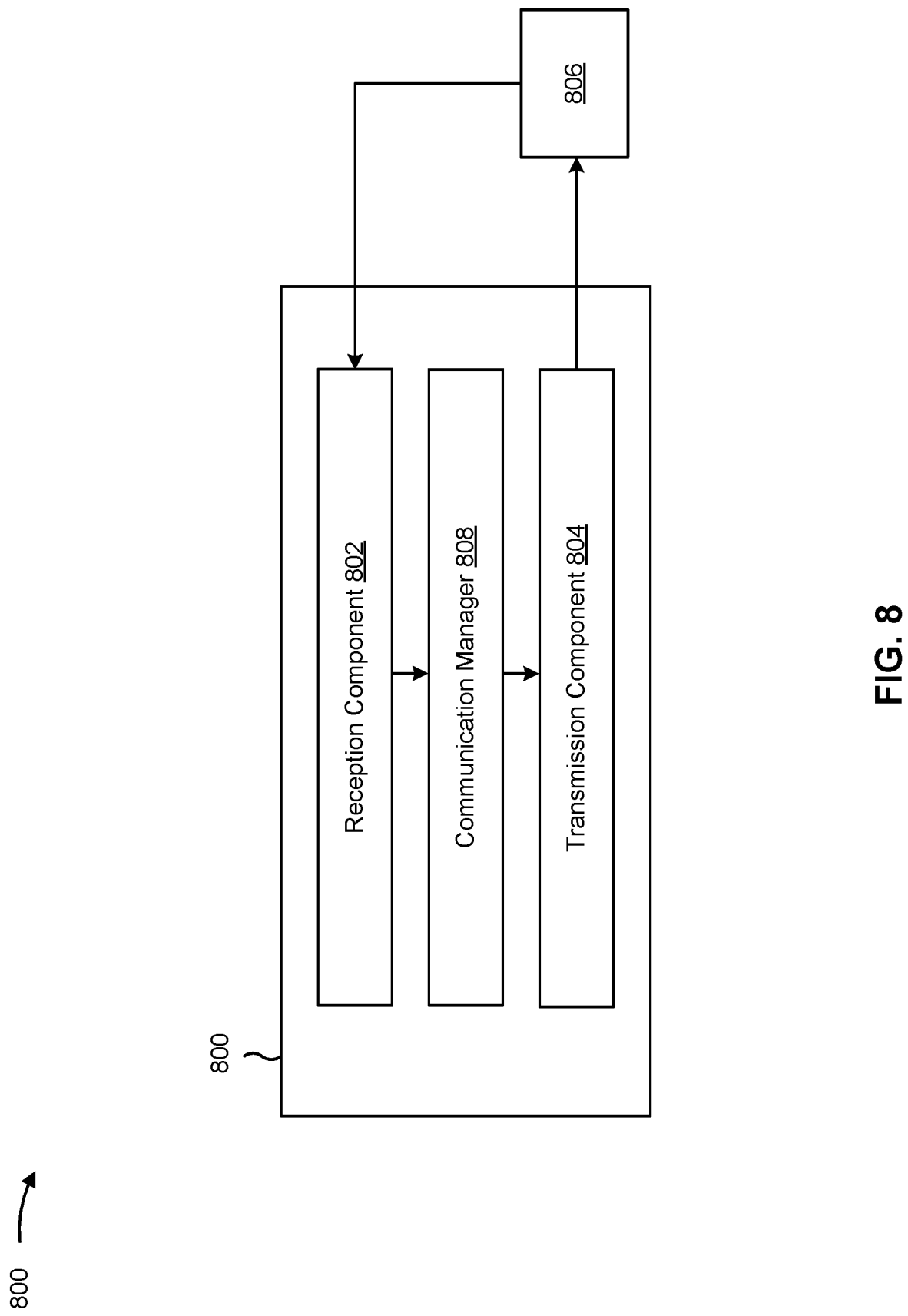
FIGS. 8 and 9 are diagrams of example apparatuses for wireless communication, in accordance with the present disclosure.

FIG. 8 is a diagram of an example apparatus 800 for wireless communication. The apparatus 800 may be a receiving device, or a receiving device may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., the communication manager 140 or 150). The communication manager 808 may include a determination component configured to perform one or more determinations that form a basis for one or more operations, and/or a selecting component for selecting a matched filter, among other examples.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the receiving device described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the receiving device described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the receiving device described in connection with FIG. 2. In some aspects, the transmission component 804 may be co-located with the reception component 802 in a transceiver.

The reception component 802 may receive, in a communication, an indication of a shaping filter to be used with one or more subsequent communications. The reception component 802 may receive the one or more subsequent communications having the shaping filter applied.

The transmission component 804 may transmit an indication of a capability of the receiving device to update matched filters based at least in part on the indication of the shaping filter.

The reception component 802 may receive an indication of a set of candidate shaping filters wherein the indication of the shaping filter includes an indication of the shaping filter within the set of candidate shaping filters.

The transmission component 804 may transmit a request to reduce a number of taps used for the one or more subsequent communications wherein receiving the indication of the shaping filter is based at least in part on transmitting the request.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
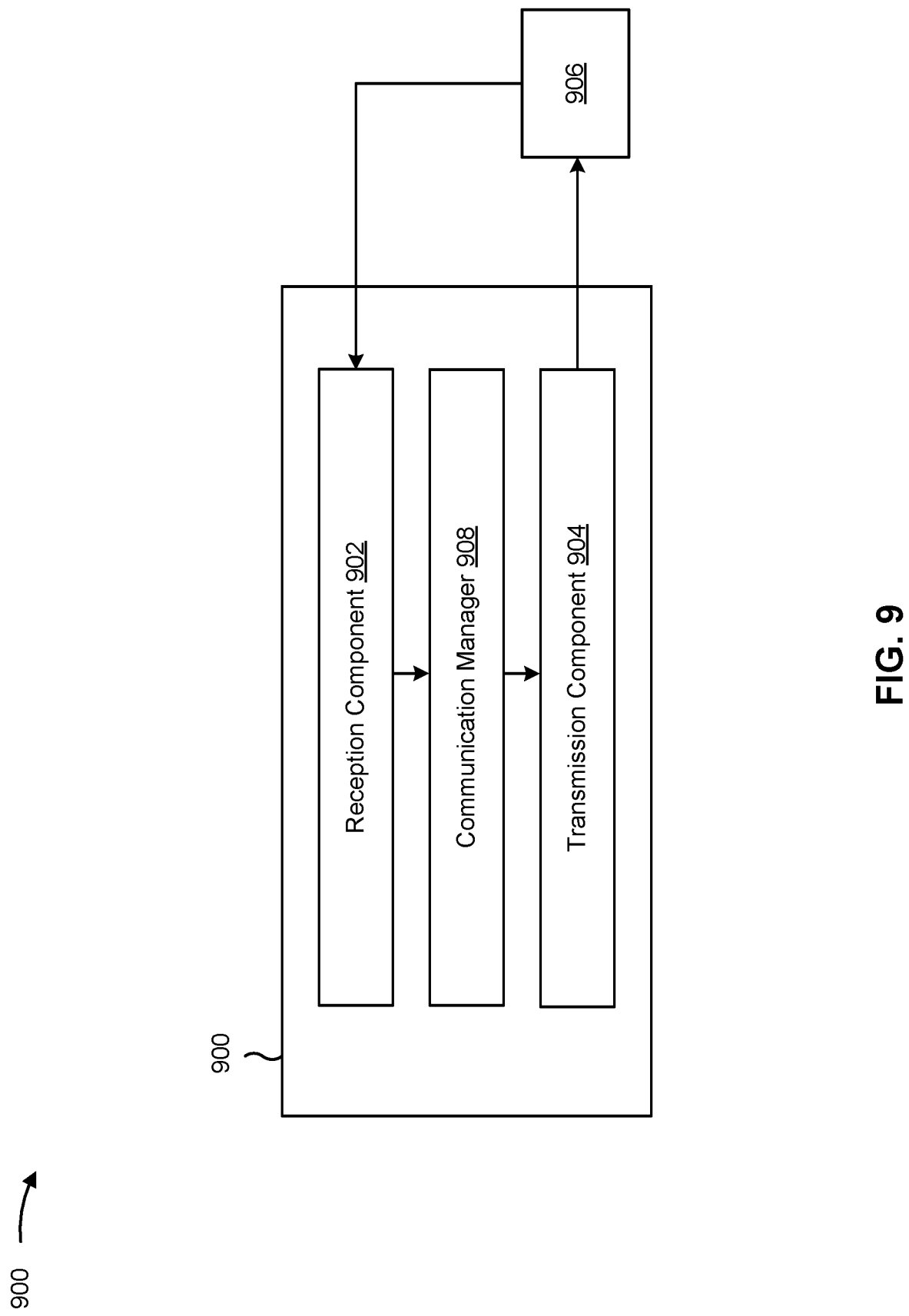

FIG. 9 is a diagram of an example apparatus 900 for wireless communication. The apparatus 900 may be a transmitting device, or a transmitting device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 140 or 150). The communication manager 908 may include a determination component configured to perform one or more determinations that form a basis for one or more operations, and/or a selecting component for selecting a shaping filter, among other examples In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the transmitting device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the transmitting device described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the transmitting device described in connection with FIG. 2. In some aspects, the transmission component 904 may be co-located with the reception component 902 in a transceiver.

The transmission component 904 may transmit, in a communication, an indication of a shaping filter to be used with one or more subsequent communications. The transmission component 904 may transmit the one or more subsequent communications having the shaping filter applied.

The communication manager 908 (e.g., using the waveform shaping component) may apply a shaping filter to the one or more subsequent communications.

The reception component 902 may receive an indication of a capability of a receiving device to update matched filters based at least in part on the indication of the shaping filter.

The transmission component 904 may transmit an indication of a set of candidate shaping filters wherein the indication of the shaping filter includes an indication of the shaping filter within the set of candidate shaping filters.

The reception component 902 may receive a request to reduce a number of taps used for the one or more subsequent communications wherein transmitting the indication of the shaping filter is based at least in part on receiving the request.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a receiving device, comprising: receiving, in a communication, an indication of a shaping filter to be used with one or more subsequent communications; and receiving the one or more subsequent communications having the shaping filter applied.

Aspect 2: The method of Aspect 1, wherein receiving the one or more subsequent communications comprises: applying an updated matched filter, associated with the shaping filter, to received samplings associated with the one or more subsequent communications.

Aspect 3: The method of any of Aspects 1-2, further comprising: transmitting an indication of a capability of the receiving device to update matched filters based at least in part on the indication of the shaping filter.

Aspect 4: The method of Aspect 3, wherein the indication of the capability of the receiving device to update matched filters comprises an indication of one or more of: filter lengths supported by the receiving device, numbers of bits used for different filter lengths supported by the receiving device, or power consumed for different filter lengths supported by the receiving device.

Aspect 5: The method of any of Aspects 1-4, wherein receiving the one or more subsequent communications comprises: receiving the one or more subsequent communications via one or more single carrier waveform communications.

Aspect 6: The method of any of Aspects 1-5, wherein the indication of the shaping filter comprises one or more of: a number of taps used, or values of the taps.

Aspect 7: The method of Aspect 6, wherein the indication of the shaping filter indicates the values of the taps via one or more of: a fixed number of bits, or an indication that the shaping filter is symmetric.

Aspect 8: The method of any of Aspects 1-7, further comprising receiving an indication of a set of candidate shaping filters, wherein the indication of the shaping filter includes an indication of the shaping filter within the set of candidate shaping filters.

Aspect 9: The method of any of Aspects 1-8, further comprising transmitting a request to reduce a number of taps used for the one or more subsequent communications, wherein receiving the indication of the shaping filter is based at least in part on transmitting the request.

Aspect 10: The method of any of Aspects 1-9, wherein the indication of the shaping filter comprises an indication of a recommended matched filter to apply to reception of the one or more subsequent communications.

Aspect 11: A method of wireless communication performed by a transmitting device, comprising: transmitting, in a communication, an indication of a shaping filter to be used with one or more subsequent communications; and transmitting the one or more subsequent communications having the shaping filter applied.

Aspect 12: The method of Aspect 11, further comprising: applying a shaping filter to the one or more subsequent communications.

Aspect 13: The method of Aspect 12, wherein application of the shaping filter is based at least in part on one or more of: an error vector magnitude associated with peak-to-average-power-ratio reduction, a rank of a shared channel associated with the one or more subsequent communications, a restriction of out of band emissions, power consumption for a receiving device, an expected signal-to-interference-plus-noise ratio as observed at the receiving device, or interference mitigation associated with communications with an additional receiving device or an additional transmitting device.

Aspect 14: The method of any of Aspects 11-13, wherein transmitting the one or more subsequent communications comprises: applying the shaping filter to transmitted signals associated with the one or more subsequent communications.

Aspect 15: The method of any of Aspects 11-14, further comprising: receiving an indication of a capability of a receiving device to update matched filters based at least in part on the indication of the shaping filter.

Aspect 16: The method of Aspect 15, wherein the indication of the capability of the receiving device to update matched filters comprises an indication of one or more of: filter lengths supported by the receiving device, numbers of bits used for different filter lengths supported by the receiving device, or power consumed for different filter lengths supported by the receiving device.

Aspect 17: The method of any of Aspects 11-16, wherein transmitting the one or more subsequent communications comprises: transmitting the one or more subsequent communications via one or more single carrier waveform communications.

Aspect 18: The method of any of Aspects 11-17, wherein the indication of the shaping filter comprises one or more of: a number of taps used, or values of the taps.

Aspect 19: The method of Aspect 18, wherein the indication of the shaping filter indicates the values of the taps via one or more of: a fixed number of bits, or an indication that the shaping filter is symmetric.

Aspect 20: The method of any of Aspects 11-19, further comprising transmitting an indication of a set of candidate shaping filters, wherein the indication of the shaping filter includes an indication of the shaping filter within the set of candidate shaping filters.

Aspect 21: The method of any of Aspects 11-20, further comprising receiving a request to reduce a number of taps used for the one or more subsequent communications, wherein transmitting the indication of the shaping filter is based at least in part on receiving the request.

Aspect 22: The method of any of Aspects 11-21, wherein the indication of the shaping filter comprises an indication of a recommended matched filter to apply to reception of the one or more subsequent communications.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiving device for wireless communication, comprising:
   one or more memories; and
   one or more processors coupled to the one or more memories, the one or more processors individually or collectively configured to:
      transmit a request to change a shaping filter to be used with one or more communications;
      receive an indication of an updated shaping filter based at least in part on the request, wherein the indication is received via a wireless connection configured for single carrier (SC) communication, and wherein the indication comprises a fixed number of bits of downlink control information indicating a number of taps and locations of at least half of the taps; and
      receive, via one or more SC waveform communications, the one or more communications having the updated shaping filter applied.

2. The receiving device of claim 1, wherein the one or more processors, to receive the one or more communications, are configured to:
   apply an updated matched filter, associated with the updated shaping filter, to received samplings associated with the one or more communications.

3. The receiving device of claim 1, wherein the one or more processors are further configured to:
   transmit an indication of a capability of the receiving device to update matched filters based at least in part on the indication of the updated shaping filter.

4. The receiving device of claim 3, wherein the indication of the capability of the receiving device to update matched filters comprises an indication of one or more of:
   filter lengths supported by the receiving device,
   numbers of bits used for different filter lengths supported by the receiving device, or power consumed for different filter lengths supported by the receiving device.

5. The receiving device of claim 1, wherein the indication of the updated shaping filter comprises one or more of:
a number of taps used, or
values of the taps.

6. The receiving device of claim 5, wherein the indication of the updated shaping filter indicates the values of the taps via an indication that the updated shaping filter is symmetric.

7. The receiving device of claim 1, wherein the one or more processors are further configured to receive an indication of a set of candidate shaping filters,
wherein the indication of the updated shaping filter includes an indication of the updated shaping filter within the set of candidate shaping filters.

8. The receiving device of claim 1, wherein the one or more processors, to transmit the request to change the shaping filter, are configured to:
transmit a request to reduce a number of taps used for the one or more communications.

9. The receiving device of claim 1, wherein the indication of the updated shaping filter comprises an indication of a recommended matched filter to apply to reception of the one or more communications.

10. The receiving device of claim 1, wherein the one or more processors are further configured to:
establish the wireless connection with a transmitting device, wherein the receiving device and the transmitting device communicate using a millimeter wave frequency band.

11. A transmitting device for wireless communication, comprising:
one or more memories; and
one or more processors coupled to the one or more memories, the one or more processors individually or collectively configured to:
receive a request to change a shaping filter to be used with one or more communications;
transmit an indication of an updated shaping filter based at least in part on the request, wherein the indication is transmitted via a wireless connection configured for single carrier (SC) communication, and wherein the indication comprises a fixed number of bits of uplink control information indicating a number of taps and locations of at least half of the taps; and
transmit, via one or more SC waveform communications, the one or more communications having the updated shaping filter applied.

12. The transmitting device of claim 11, wherein the one or more processors are further configured to:
apply the updated shaping filter to the one or more communications.

13. The transmitting device of claim 12, wherein the wireless connection is established between the transmitting device and a receiving device, and
wherein application of the updated shaping filter is based at least in part on one or more of:
an error vector magnitude associated with peak-to-average-power-ratio reduction,
a rank of a shared channel associated with the one or more communications,
a restriction of out of band emissions,
power consumption for the receiving device, or
an expected signal-to-interference-plus-noise ratio as observed at the receiving device.

14. The transmitting device of claim 11, wherein the one or more processors, to transmit the one or more communications, are configured to:
apply the updated shaping filter to transmitted signals associated with the one or more communications.

15. The transmitting device of claim 11, wherein the one or more processors are further configured to:
receive an indication of a capability of a receiving device to update matched filters based at least in part on the indication of the updated shaping filter.

16. The transmitting device of claim 15, wherein the indication of the capability of the receiving device to update matched filters comprises an indication of one or more of:
filter lengths supported by the receiving device,
numbers of bits used for different filter lengths supported by the receiving device, or
power consumed for different filter lengths supported by the receiving device.

17. The transmitting device of claim 11, wherein the indication of the updated shaping filter comprises values of the taps.

18. The transmitting device of claim 17, wherein the indication of the updated shaping filter indicates the values of the taps via an indication that the updated shaping filter is symmetric.

19. The transmitting device of claim 11, wherein the one or more processors are further configured to transmit an indication of a set of candidate shaping filters,
wherein the indication of the updated shaping filter includes an indication of the updated shaping filter within the set of candidate shaping filters.

20. The transmitting device of claim 11, wherein the one or more processors, to receive the request to change the shaping filter, are configured to:
receive a request to reduce a number of taps used for the one or more communications.

21. The transmitting device of claim 11, wherein the indication of the updated shaping filter comprises an indication of a recommended matched filter to apply to reception of the one or more communications.

22. The transmitting device of claim 11, wherein the one or more processors are further configured to:
receive configuration information indicating the transmitting device apply at least one matched filter associated with the updated shaping filter, wherein the at least one matched filter is to be applied to a set of samplings associated with the one or more communications.

23. A method of wireless communication performed by a receiving device, comprising:
transmitting a request to change a shaping filter to be used with one or more communications;
receiving an indication of an updated shaping filter based at least in part on the request, wherein the indication is received via a wireless connection configured for single carrier (SC) communication, and wherein the indication comprises a fixed number of bits of downlink control information indicating a number of taps and locations of at least half of the taps; and
receiving, via one or more SC waveform communications, the one or more communications having the updated shaping filter applied.

24. The method of claim 23, wherein receiving the one or more communications comprises:
applying an updated matched filter, associated with the updated shaping filter, to received samplings associated with the one or more communications.

25. The method of claim 23, further comprising:
transmitting an indication of a capability of the receiving device to update matched filters based at least in part on the indication of the updated shaping filter.

26. The method of claim 23, wherein transmitting the request to change the shaping filter comprises:
transmitting a request to reduce a number of taps used for the one or more communications.

27. A method of wireless communication performed by a transmitting device, comprising:
receiving a request to change a shaping filter to be used with one or more communications;
transmitting an indication of an updated shaping filter based at least in part on the request, wherein the indication is transmitted via a wireless connection configured for single carrier (SC) communication, and wherein the indication comprises a fixed number of bits of uplink control information indicating a number of taps and locations of at least half of the taps; and
transmitting, via one or more SC waveform communications, the one or more communications having the updated shaping filter applied.

28. The method of claim 27, further comprising:
applying the updated shaping filter to the one or more communications.

29. The method of claim 28, wherein the wireless connection is established between the transmitting device and a receiving device, and
wherein application of the updated shaping filter is based at least in part on one or more of:
an error vector magnitude associated with peak-to-average-power-ratio reduction,
a rank of a shared channel associated with the one or more communications,
a restriction of out of band emissions,
power consumption for the receiving device, or
an expected signal-to-interference-plus-noise ratio as observed at the receiving device.

30. The method of claim 27, wherein transmitting the one or more communications comprises:
applying the updated shaping filter to transmitted signals associated with the one or more communications.

* * * * *